United States Patent [19]
Ehrlich

[11] Patent Number: 5,764,162
[45] Date of Patent: Jun. 9, 1998

[54] MICROPOWER IMPULSE RADAR BASED WHEEL DETECTOR

[75] Inventor: Kenneth P. Ehrlich, County of Allegheny, Pa.

[73] Assignee: Union Switch & Signal Inc., Pittsburgh, Pa.

[21] Appl. No.: 643,224

[22] Filed: May 2, 1996

Related U.S. Application Data

[60] Provisional application No. 60/001,262, Jul. 20, 1995.

[51] Int. Cl.$^6$ .................................................. G08G 1/01
[52] U.S. Cl. .................. 340/933; 340/935; 340/936; 342/104; 246/122 R
[58] Field of Search .................. 340/933, 935, 340/936, 942, 943; 342/104, 114; 246/122 R, 169 S

[56] References Cited

U.S. PATENT DOCUMENTS

| | | | |
|---|---|---|---|
| 3,109,157 | 10/1963 | Bolton | 340/943 |
| 4,129,276 | 12/1978 | Svet | 246/169 S |
| 4,200,855 | 4/1980 | Gilcher | 338/5 |
| 4,200,856 | 4/1980 | Gilcher | 338/5 |
| 4,524,932 | 6/1985 | Bodziak | 246/247 |
| 5,361,070 | 11/1994 | McEwan | 342/21 |

FOREIGN PATENT DOCUMENTS

| | | | |
|---|---|---|---|
| 0130226A | 7/1983 | European Pat. Off. | |
| 0403954A2 | 12/1990 | European Pat. Off. | G01S 13/91 |
| 2691262A | 11/1993 | France | |
| 3025718C2 | 12/1992 | Germany | G01S 13/91 |
| 875918 | 8/1961 | United Kingdom | |
| 979621 | 1/1965 | United Kingdom | |
| 1082109 | 9/1967 | United Kingdom | G01S 9/56 |
| 1315533 | 5/1973 | United Kingdom | G01S 9/06 |
| 1479616 | 7/1977 | United Kingdom | G01S 9/56 |

OTHER PUBLICATIONS

"Technology Advances," Facsimile from LLNL Laser Engrs. Div. dated Nov. 17, 1994, 1 page.

"Lawrence Livermore Laboratory: Hoping to Make Highways Safer", Facsimile from LLNL Laser Engrg. Div. dated Nov. 17, 1994, 1 page.

"Indoor Radar," Appliance Manufacturer, May 1994, p. 98.

"Advance in Radar Makes Compact Systems Possible," R&D News, Facsimile from LLNL Laser Engrg. Div. dated Nov. 17, 1994, 1 page.

Andrews, Walter, ASIC–Based Vehicle, Tool Aplications Seen For Livermore Radar, Electronic News, May 23, 1994, p. 40.

"Business Mechanisms in Technology Transfer", Internet Web Page from Lawrence Livermore Laboratory, Facsimile from LLNL Laser Engrg. Div. dated Nov. 17, 1994, 2 pages.

"About the PC/104 Consortium", PC/104 Consortium, Sunnyvale, California, 4 pages.

Brochure: "WinSystems PCM–ENET–10T Ethernet Controller with Twisted Pair and AUI", Arlington, Texas, 2 pages.

Brochure: "Lawrence Livewrmore National laboratory's Micropower Impusel Radar (MIR) Technology," Facsimile from LLNL Laser Engrg. Div. dated Nov. 17, 1994, 1 page.

*Primary Examiner*—Jeffery Hofsass
*Assistant Examiner*—Sihong Huang
*Attorney, Agent, or Firm*—Kevin A. Sembrat

[57] ABSTRACT

A wheel detector for indicating the presence of a rail vehicle on a set of spaced rails is disclosed. The wheel detector transmits a radar pulse signal and samples a portion of the signal corresponding to a target area on one of the rails. The wheel detector will generate an indication signal if a change in the reflectivity of the received signal corresponding to the target area is detected. The wheel detector may additionally include multiple transmitters and receivers to provide redundancy, and be configured to determine the linear velocity and direction of a wheel.

12 Claims, 7 Drawing Sheets

5,764,162

MICROPOWER IMPULSE RADAR BASED WHEEL DETECTOR

CROSS-REFERENCE TO RELATED APPLICATION

This application claims the benefit of U.S. Provisional Application No. 60/001,262, filed Jul. 20, 1995, which is hereby incorporated by reference in its entirety.

BACKGROUND OF THE INVENTION

1. Field of the Invention

This invention relates generally to train car wheel detectors and, more particularly, to wheel detectors which utilize Micropower Impulse Radar to measure the position, direction and linear velocity of a train car wheel at a fixed point along the right-of-way.

2. Description of the Related Art

Wheel detection is an essential function to the railroad industry. Wheel detectors may be used to determine train car position and direction, measure train car velocity and rolling resistance, confirm track circuits and presence detectors, and initiate various control sequences.

A number of devices have been developed to detect the presence of a train car wheel. U.S. Pat. No. 4,200,855 discloses a bolt-like railway vehicle detector wherein a pair of bolt-like sensor units are fastened to holes formed in the web portion of the track rail. This detector further includes strain gages which are tensioned under the load of a wheel. This tensioning varies the resistance of the strain gages and permits detection of the wheel. U.S. Pat. No. 4,200,856 discloses a differential clamp-on railway vehicle wheel detector. This detector includes a pair of clamp-on sensor units which are positioned on the upper surface of the base flange of the track rail. A pair of C-shaped clamps holds the units onto the base flange. A strain gage element in this detector is stressed by the load of a wheel. The presence of the wheel may be detected by monitoring the resistance of the strain gage.

U.S. Pat. No. 4,524,932 discloses a railway car wheel detector which uses a Hall effect element for detection of a wheel. The Hall effect element is mounted on top of a permanent magnet and this assembly is mounted on the rail such that an air gap is formed between the assembly and the rail. The presence of a wheel within the air gap increases the level of the magnetic flux and the output voltage of the Hall effect element is subsequently increased. The increased Hall effect element output voltage indicates the presence of a train wheel.

As described previously, each of these devices requires physical attachment to either the web or base flange portion of the rail. Accordingly, these devices are subjected to harsh vibrations during the passage of a train. These vibrations may damage the detector assemblies or throw off the calibration of the sensor element thereby resulting in increased maintenance and failure of the wheel detector. In addition, the mounting assemblies used in the prior art devices must provide secure attachment and are subsequently complex and restricted in application.

Therefore, it is of primary importance to place the wheel detectors away from the rails of the train track. However, the prior art devices require physical attachment to the rail and are not suitable for reliable, accurate, and low power remote detection of a train wheel.

Other experimental devices have not provided a feasible solution. In particular, the utilization of photocells, lasers and other light detectors has proven to be unreliable due to factors including adverse weather conditions and fragility.

Additionally, the prior art devices do not provide fault tolerance, fault detection and increased reliability in a single wheel detector. Further, two prior art devices are required to detect the presence of a wheel at two locations on the rail for determining linear velocity and direction.

It is the object of the invention to provide a wheel detector which is reliable, fault tolerant, fault diagnostic and requires no physical attachment to the train rail. It is a further object of the invention to provide a single device which may detect the presence of a wheel and simultaneously measure the linear velocity and determine the direction of a wheel. It is an additional object of the invention to provide a wheel detector which may be easily installed and calibrated and requires low maintenance. It is a further object of the invention to provide a wheel detector which is immune to electromagnetic and radio-frequency interference as well as changes in weather conditions, and will not interfere with other railway electronic devices.

SUMMARY OF THE INVENTION

The invention provides for a wheel detector for indicating the presence of a rail vehicle on a set of spaced rails by detecting the presence of a wheel on one of the rails. The wheel detector includes a radar pulse signal generator and a transmitter for emitting a radar pulse signal toward one of the rails. The wheel detector further includes a receiver for sampling the radar pulse signal echoed from a first target area above one of the rails. The receiver and transmitter are preferably laterally spaced from the rails.

The wheel detector additionally has a motion processor for monitoring the radar pulse signal echoed from the first target area. The motion processor produces an indication signal in response to a change in the reflectivity of the radar pulse signal which corresponds to the presence of a wheel within the first target area. The motion processor may alternatively be configured to monitor two target areas on the rail to provide velocity calculations from a single wheel detector. The wheel detector may additionally include three transmitters and receivers to provide reliable and fault tolerant operation and wheel direction information.

BRIEF DESCRIPTION OF THE DRAWINGS

The invention will be more readily apparent to those skilled in the art by reference to the accompanying drawings wherein.

DETAILED DESCRIPTION OF THE PREFERRED EMBODIMENTS

1. Detailed Description of the Figures

This invention provides a fault tolerant, fault diagnostic, and highly reliable wheel detector which utilizes Micropower Impulse Radar (MIR) to detect the presence, direction and linear velocity of a train wheel at designated points along a right-of-way. A transmitter in the MIR emits a wideband pulse of amplified noise at a Pulse Repetition Interval (PRI) toward the right-of-way. An alarm signal is generated if a train wheel passes through a preset range increment set at a point along the right-of-way. The wheel detectors may be utilized in a basic discrete Input/Output (I\O) design or in Local Area Network (LAN) configurations.

Figure 1:
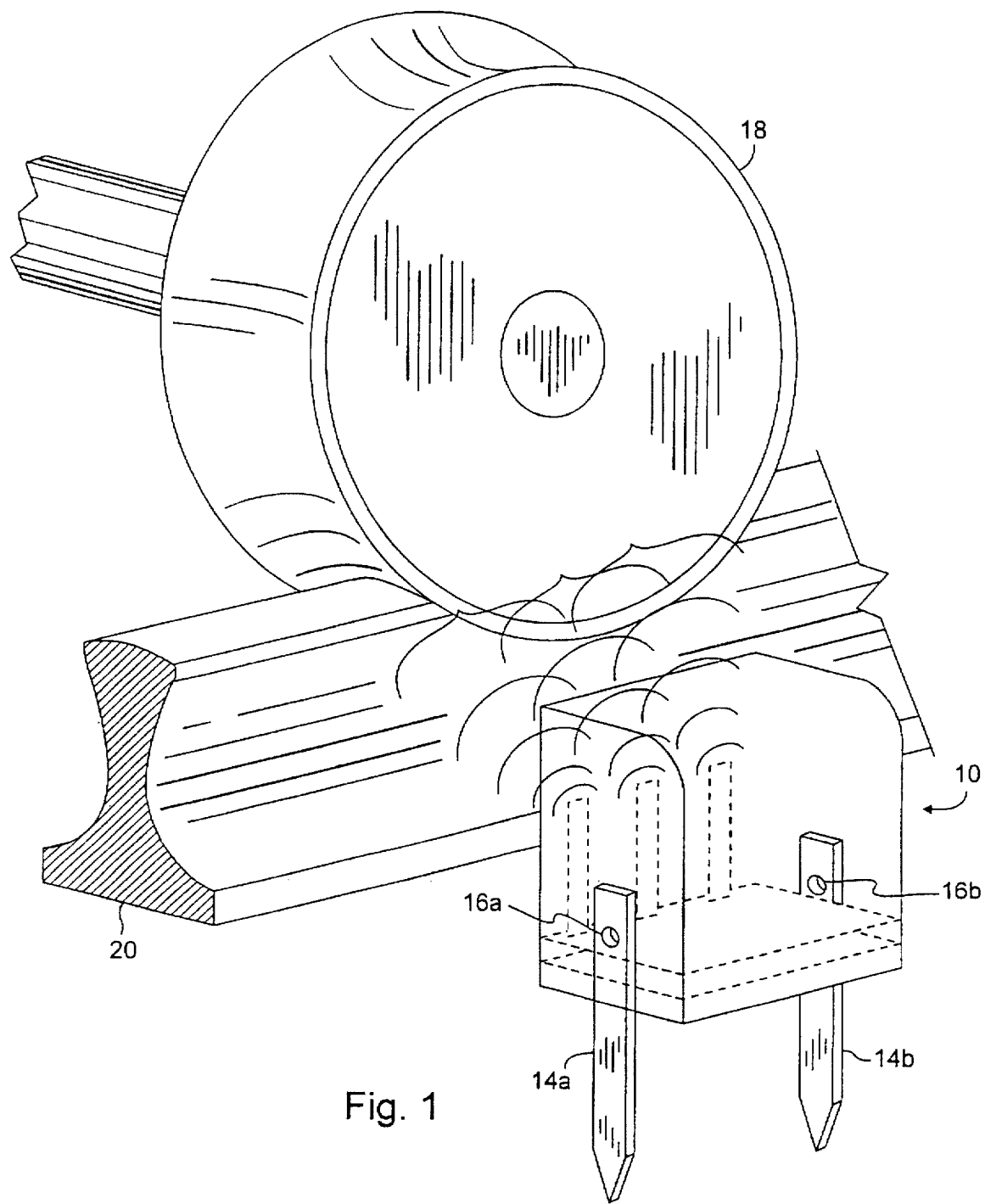
FIG. 1 is a perspective view of a wheel detector according to the invention laterally spaced from a rail.

FIG. 1 shows a wheel detector 10 which is adjacent to a rail 20. The wheel detector 10 may be placed within 4 track widths from the rail 20 and may be either connected to the rail 20 or physically separated from the rail 20 as shown in FIG. 1.

The accuracy of the wheel detector 10 can be increased with closer positioning to the rail 20. However, it is also favorable to place the wheel detector 10 away from the rail 20 to protect the wheel detector 10 from harsh vibrations. The exact positioning of each wheel detector 10 will depend on numerous factors including track environment.

A pair of mounting posts 14a, 14b may have holes 16a, 16b therein to accept the wheel detector 10 and permit vertical rotation thereof for elevation calibration. The wheel detector 10 should preferably be positioned in the same horizontal plane as a wheel 18 to reduce the elevation angle and increase the signal-to-noise ratio of a receiver output signal 41 of an MIR 26 (refer to FIGS. 2a & 2b).

The wheel detector 10 may have two parameters of calibration including elevational and azimuthal. The wheel detector 10 may be calibrated with a voltmeter (not shown) to detect a wheel 18 within a precise target area 22 (refer to FIGS. 2a & 2b) on the rail 20.

Figure 2A:
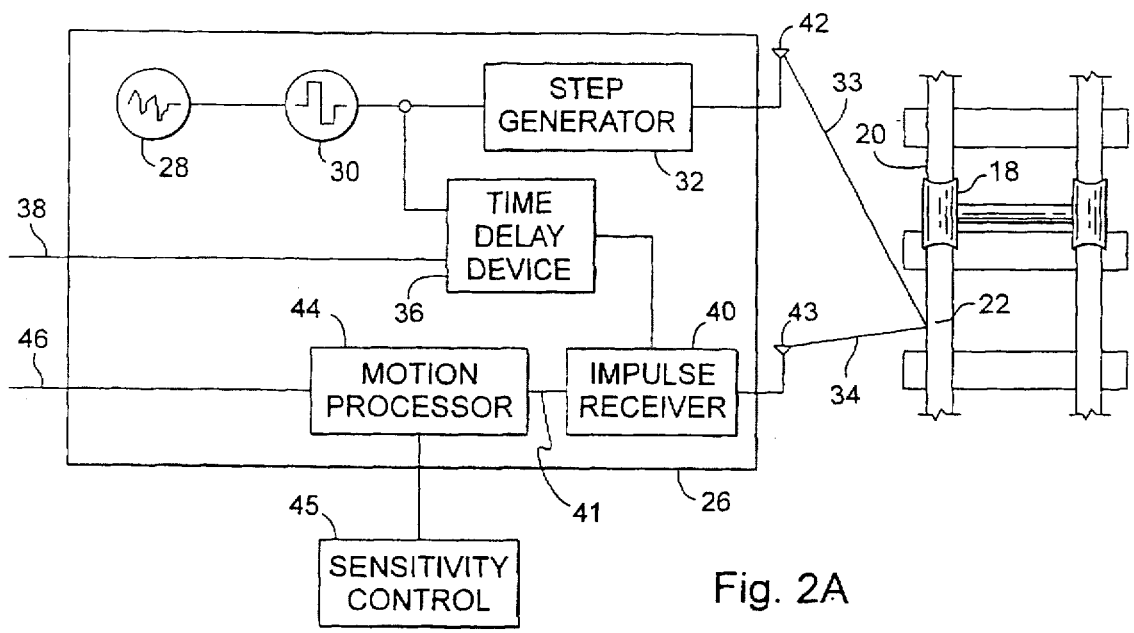
FIG. 2a is a block diagram of a Micropower Impulse Radar circuit transmitting wide band spread spectrum pulses to detect the presence of a train wheel.
Figure 2B:
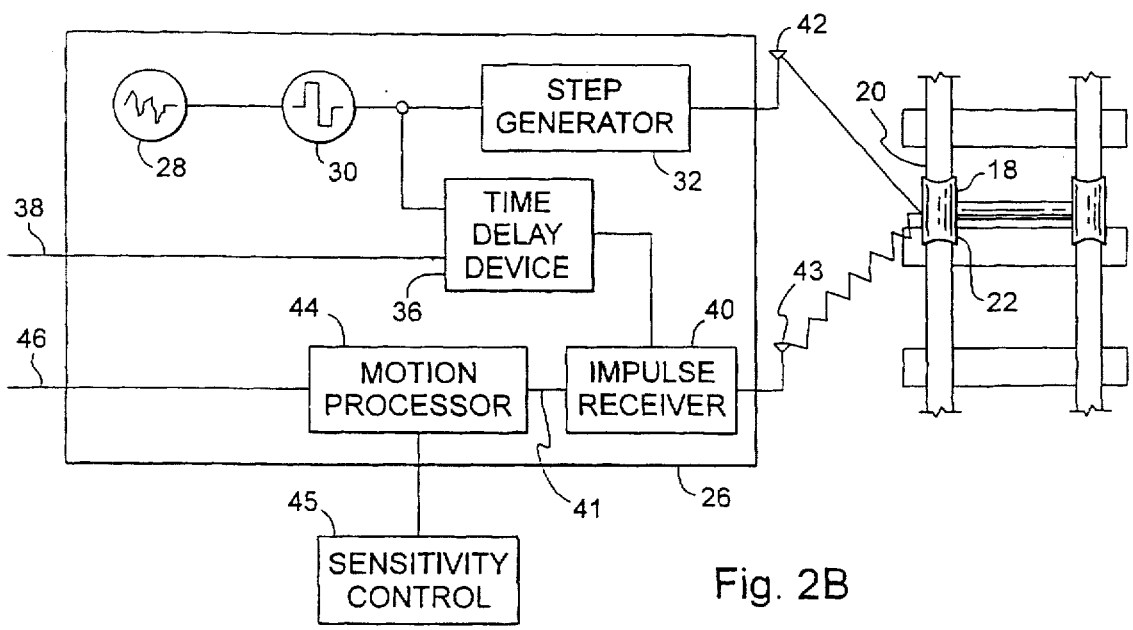
FIG. 2b is a block diagram of the Micropower Impulse Radar circuit sampling a complex series of echoes to detect the presence of a wheel and providing an indication signal when a wheel is detected.

FIGS. 2a and 2b are functional block diagrams of the MIR 26 disclosed in U.S. Pat. No. 5,361,070, which is incorporated herein by reference. FIGS. 2a and 2b show the transmit and receive components of the MIR 26. In particular, a first square wave oscillator 30 generates a radar pulse repetition interval (PRI) at a chosen frequency between 30 kHz and 2MHz. A noise generator 28 introduces a random variation to the PRI which randomizes the time of emission of a radar pulse signal 33 and creates a spread spectrum that looks like random noise to conventional receivers. The first square wave oscillator 30 may be connected to a step generator 32 which generates a transmit pulse according to the PRI and the radar pulse signal 33 is emitted via a transmitter antenna 42. Each pulse of the radar pulse signal has a preferred bandwidth of 0.1 ns.

The wheel detector 10 preferably utilizes spread spectrum signaling to provide immunity from electromagnetic and radio-frequency interference present in the railway environment. In addition, the wheel 10 detector will not interfere with track circuits, track and cab signaling equipment, radio communications equipment and other electrical devices in the railway environment.

The pulses are reflected by surrounding objects as they propagate outward and a complex series of echoes return to a receiver antenna 43 as received radar pulse signals 34. The first square wave oscillator 30 is connected to an impulse receiver 40 via a time delay device 36. The length of retardation imposed on the PRI by the time delay device 36 corresponds to the two-way echo time of the radar pulse signal 33 between the MIR 26 and the target area 22 on the rail 20. The target area 22 may be adjusted via a range control 38 which varies the length of the delay.

The time delay device 36 strobes the impulse receiver 40 to sample echoes corresponding to the target area 22. The impulse receiver 40 samples approximately 3000 samples at a frequency of 1MHz and the samples are subsequently averaged to improve the signal-to-noise ratio.

The presence of a wheel 18 within the target area 22 on the rail 20 alters the radar reflectivity of the received radar pulse signal 34. The impulse receiver 40 applies a receiver output signal 41 to a motion processor 44. The motion processor 44 compares the receiver output signal 41 to a reference voltage and generates an indication signal 46 if the reflectivity of the received radar pulse signal 34 has been altered.

The sensitivity of the motion processor 44 may be varied depending upon the strength of the receiver output signal 41 via a sensitivity control 45. This control can desensitize the wheel detector 10 to rain, insects and other environmental sources of clutter.

Figure 3:
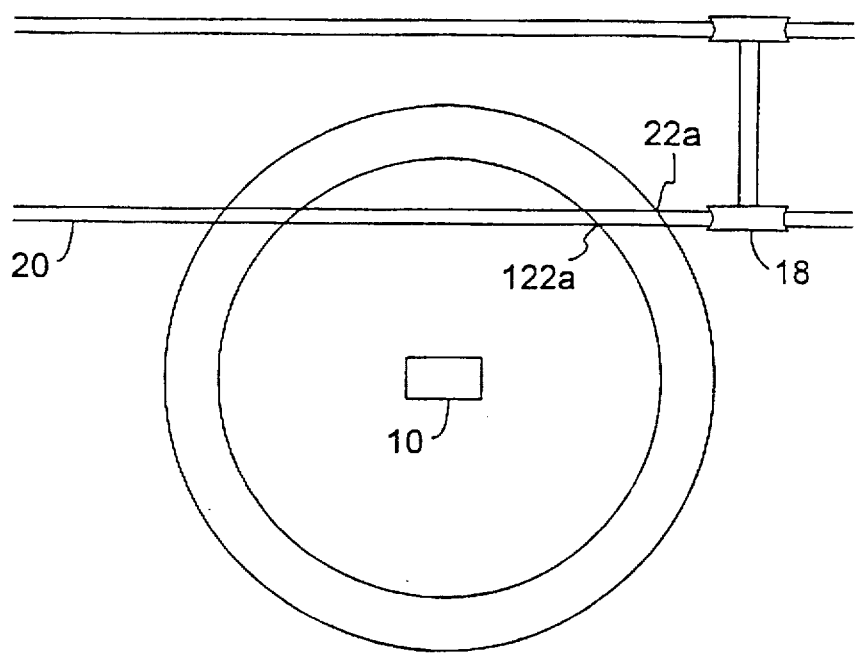
FIG. 3 is plan view of the wheel detector laterally spaced from a rail and having a Micropower Impulse Radar calibrated to detect a wheel at two ranges thereon.

The MIR 26 may be utilized in a dual detection mode in a second embodiment of the invention as shown in FIG. 3. The MIR 26 in this embodiment is configured to detect the presence of a wheel 18 at a first target area 22a and a second target area 122a on the right-of-way.

Figure 4:
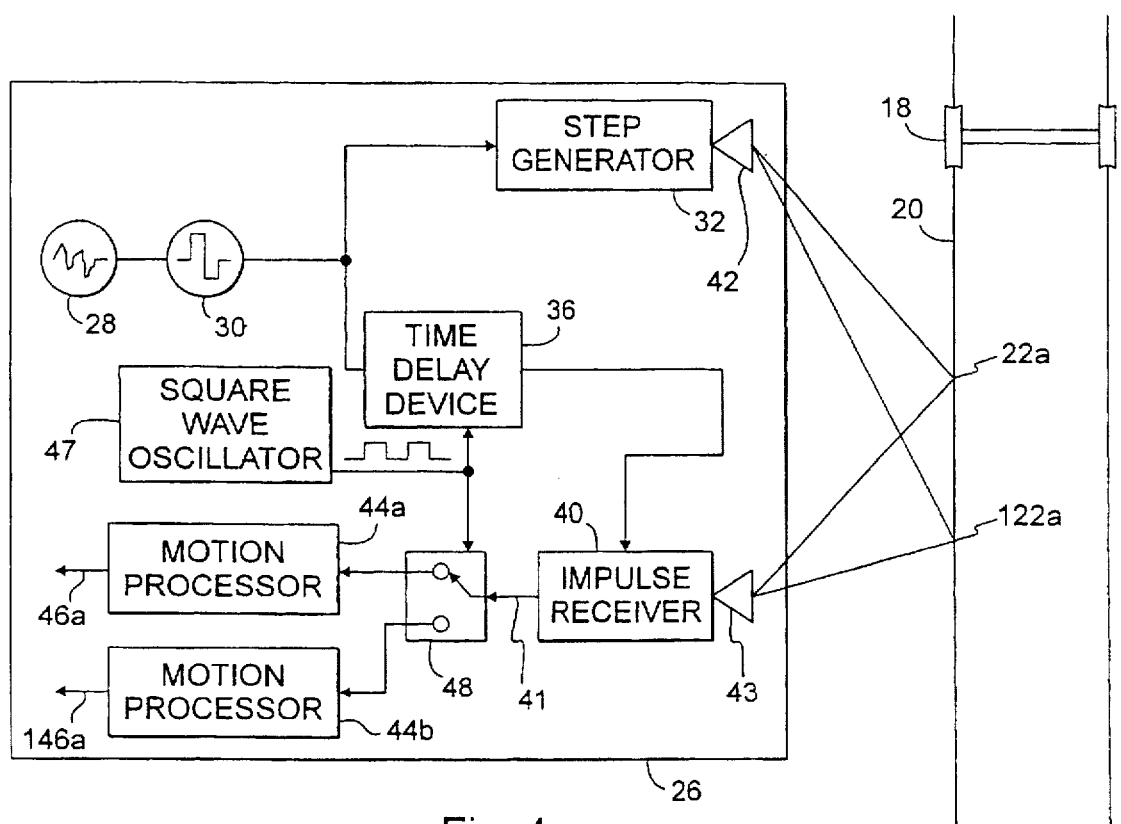
FIG. 4 is a functional block diagram of a Micropower Impulse Radar circuit further including a time multiplexed range circuit for detecting a train wheel at two ranges on the train rail.

FIG. 4 is a functional block diagram of a second embodiment of the wheel detector 10 wherein the MIR 26 is modified to include a time multiplexed range circuit. In particular, the receiver output signal 41 is applied to a first motion processor 44a and a second motion processor 44b via an analog switch 48. A second square wave oscillator 47 is applied to the time delay device 36 and the analog switch 48. The analog switch 48 alternates the range of the impulse receiver 40 between a first range corresponding to the first target area 22a for a period and a second range corresponding to the second target area 122a for a period. The first range is monitored by the first motion processor 44a and the second range is monitored by the second motion processor 44b. The ranges of the MIR 26 may be adjusted via the range control 38.

As shown in FIG. 3, a wheel detector 10 is positioned adjacent to the rail 20 and calibrated for a one foot azimuth separation of the first target area 22a and the second target area 122a. The wheel detector 10 may be calibrated for linear velocity detection by setting the MIR 26 to trigger a first indication signal 46a when a wheel 18 is positioned within the first target area 22a and setting the MIR 26 to trigger a second indication signal 146a when the wheel 18 is positioned within the second target area 122a. The linear velocity of the wheel 18 may be calculated by timing the interval between the two indication signals 46a, 146a.

Figure 5:
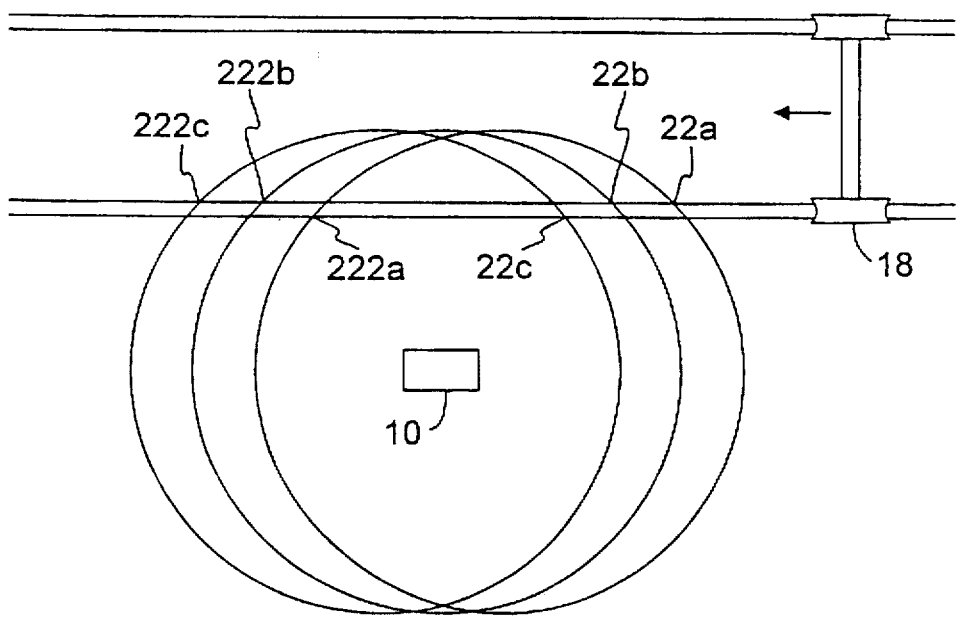
FIG. 5 is a plan view of the wheel detector laterally spaced from a rail and having three Micropower Impulse Radars.
Figure 10:
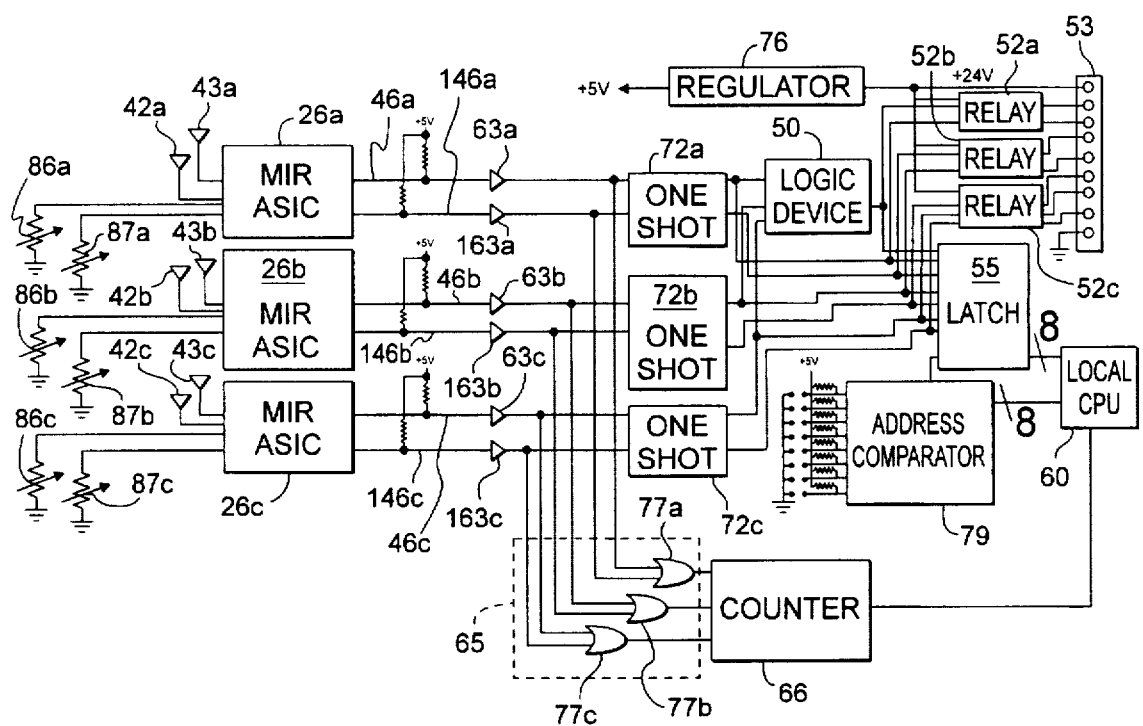
FIG. 10 is a schematic diagram of an illustrative embodiment of the wheel detector according to the invention.

As shown in FIG. 10, the wheel detector 10 may additionally include three MIRS 26a, 26b, 26c for determining the linear direction of the wheel 18. For example, a wheel 18 traveling from the right to the left will initially be detected by the first MIR 26a at a first target area 22a, followed by the second MIR 26b at a subsequent target area 22b, and the final MIR 26c at a final target area 22c as shown in FIG. 5. Accordingly, the direction of the wheel 18 may be determined by detecting which MIR 26 was triggered first by the wheel 18. The wheel detector 10 shown in FIG. 5 will generate three indication signals 46a, 46b, 46c when a wheel 18 passes through the target areas 22a, 22b, 22c or 222c, 222b, 222a depending on the linear direction of the wheel 18.

Figure 6:
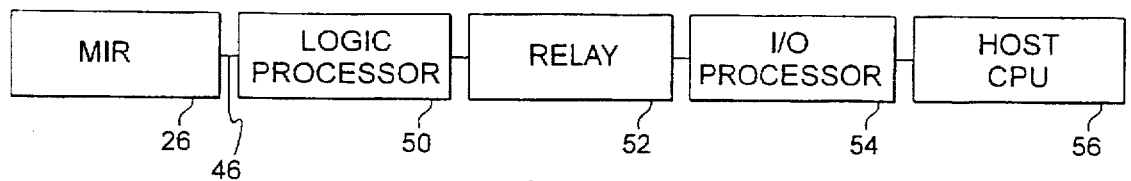
FIG. 6 is a functional block diagram of the wheel detector operating in a discrete Input\Output mode.
Figure 7:
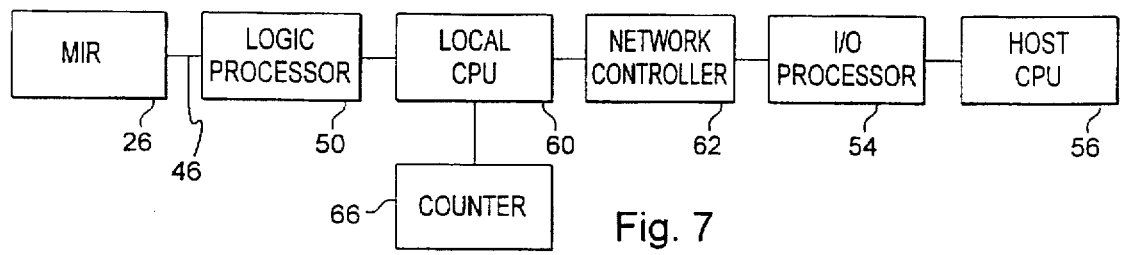
FIG. 7 is a functional block diagram of the wheel detector operating in a Local Area Network.

As shown in FIGS. 6 and 7, the indication signals 46a, 46b, 46c may be applied to a logic processor 50. The logic processor 50 will perform fault detection through an analysis of the three indication signals 46a, 46b, 46c. A fault is indicated if all three MIRs 26a, 26b, 26c do not detect a wheel 18 passing through the target areas 22a, 22b, 22c.

Fault tolerance may also be performed by the logic processor 50. In particular, the logic processor 50 will analyze the indication signals 46a, 46b, 46c and only indicate the presence of a wheel 18 if 2 out of 3 indication signals 46a, 46b, 46c are generated. This redundancy provides a reliable wheel detector 10 which will continue to accurately operate even if one MIR 26 fails. Furthermore, this configuration will eliminate many false detections because at least two MIRS 26 must generate indication signals 46 before the wheel detector 10 will indicate the detection of a wheel 18.

The logic processor 50 may be further configured to provide fault diagnosis in the event a MIR 26 should fail. The logic processor 50 may analyze the indication signals 46a, 46b, 46c when a fault is detected and generate an appropriate alarm identifying the faulty MIR 26.

The wheel detector 10 may be used in either a discrete I\O design or Local Area Network (LAN) configuration. FIG. 6 is a functional block diagram of the wheel detector 10 in a discrete I\O design. In particular, the MIR 26 indication signals 46 may be applied to the logic processor 50. The output from the logic processor may be applied to a plurality of relays 52. The relays 52 transmit 24 volt signals to an I\O processor 54 based upon the logic processor 50 output. The high voltage provides a robust and reliable signal for transmission to the I\O processor 54. A host central processing unit 56 subsequently reads the data from the I/O processor 54.

Each MIR 26 in a wheel detector 10 operating in the discrete I\O mode as a linear velocity detector may output two 24 volt signals via the relays 52 to the I\O processor 54. Each output signal corresponds to the detection of a wheel 18 in the first target area 22a or the second target area 122a. The host central processing unit 56 will count the elapsed time between the two signals and calculate the velocity based upon the distance between the first target area 22a and the second target area 122a. The host central processing unit 56 may also determine the linear direction of the wheel 18 by analyzing which MIR 26 was triggered first by the wheel 18.

Depending upon the operating environment, it may be desirable to configure the host central processing unit 56 to perform some or all of the logic functions. Accordingly, the wheel detector 10 may be designed to directly output the indication signals 46 via the relays 52 to the I\O processor 54. The host central processing unit 56 subsequently reads and processes the wheel detector 10 output from the I\O processor 54. The host central processing unit 56 may perform fault detection, fault diagnosis and include fault tolerance as an alternative to hard wiring the logic functions onto a printed circuit board (PCB) within the wheel detector 10.

As an alternative to the discrete I\O mode, the wheel detectors 10 may be utilized in Local Area Network (LAN) configurations such as a token ring (deterministic) LAN configuration or a Carrier-Sense Multiple Access/Collision Detection (CSMA/CD) (nondeterministic) LAN configuration.

The MIR 26 functions in the same way in the LAN configurations as previously described in the discrete I\O configuration. As shown in FIG. 7, the indication signals 46 are applied to the logic processor 50 wherein fault detection, fault diagnosis and fault tolerance functions may be performed. The output from the logic processor 50 is applied to a local central processing unit 60.

The local central processing unit 60 processes the logic processor 50 output to determine the presence, linear point velocity and direction of the wheel 18. The local central processing unit 60 uses a counter 66 to measure the time interval between the detection of the wheel 18 at the first target area 22a and the second target area 122a to determine the linear velocity of the wheel 18. Alternatively, the time interval could be measured between individual MIRS 26a, 26b, 26c. The utilization of three MIRs 26a, 26b, 26c provides fault tolerant operation and allows the linear direction of the wheel 18 to be determined.

Similar to the operation of the wheel detector 10 in the discrete I\O mode, the fault logic functions may be preformed by the logic processor 50 as previously described or by the local central processing unit 60.

The wheel presence, linear velocity and direction data is forwarded from the local central processing unit 60 to a network controller 62 where it is prepared for transmission through the LAN to the I\O processor 54. The I\O processor 54 organizes and stores the data and upon request transmits a profile of the yard being analyzed to the host central processing unit 56.

Figure 8:
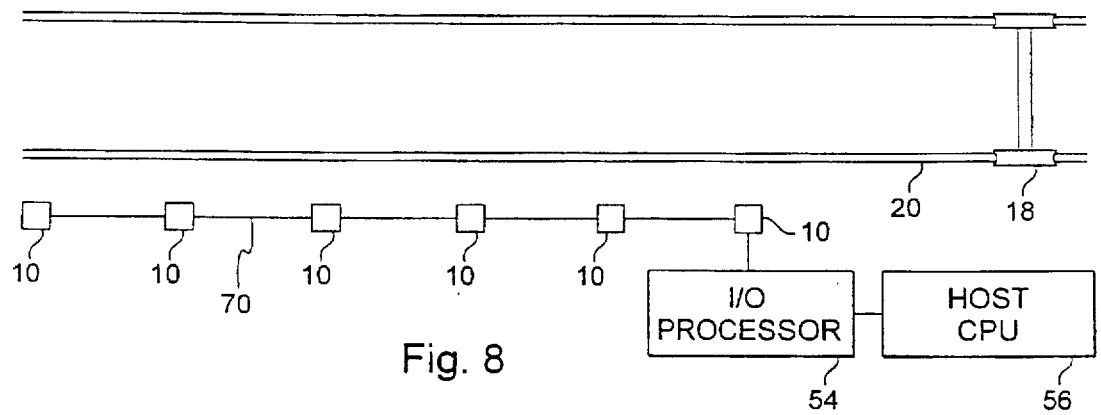
FIG. 8 is a plan view of a plurality of wheel detectors laterally spaced from a train rail in a Carrier Sense Multiple Access/Collision Detection (nondeterministic) Local Area Network configuration.

A plurality of wheel detectors 10 may be arranged in an CSMA/CD LAN configuration as shown in FIG. 8. Each wheel detector 10 in this configuration attempts to transmit its latest data via the network controller 62 to the I\O processor 54 when a bus 70 is clear. No data may be transmitted if there is a collision on the bus 70 between signals from different wheel detectors 10. Each wheel detector 10 will continue to attempt to transmit its latest data until the bus 70 is clear and its data has been transmitted. Operation in the CSMA/CD configuration may require that network loading be no more than 5% of capacity.

Figure 9:
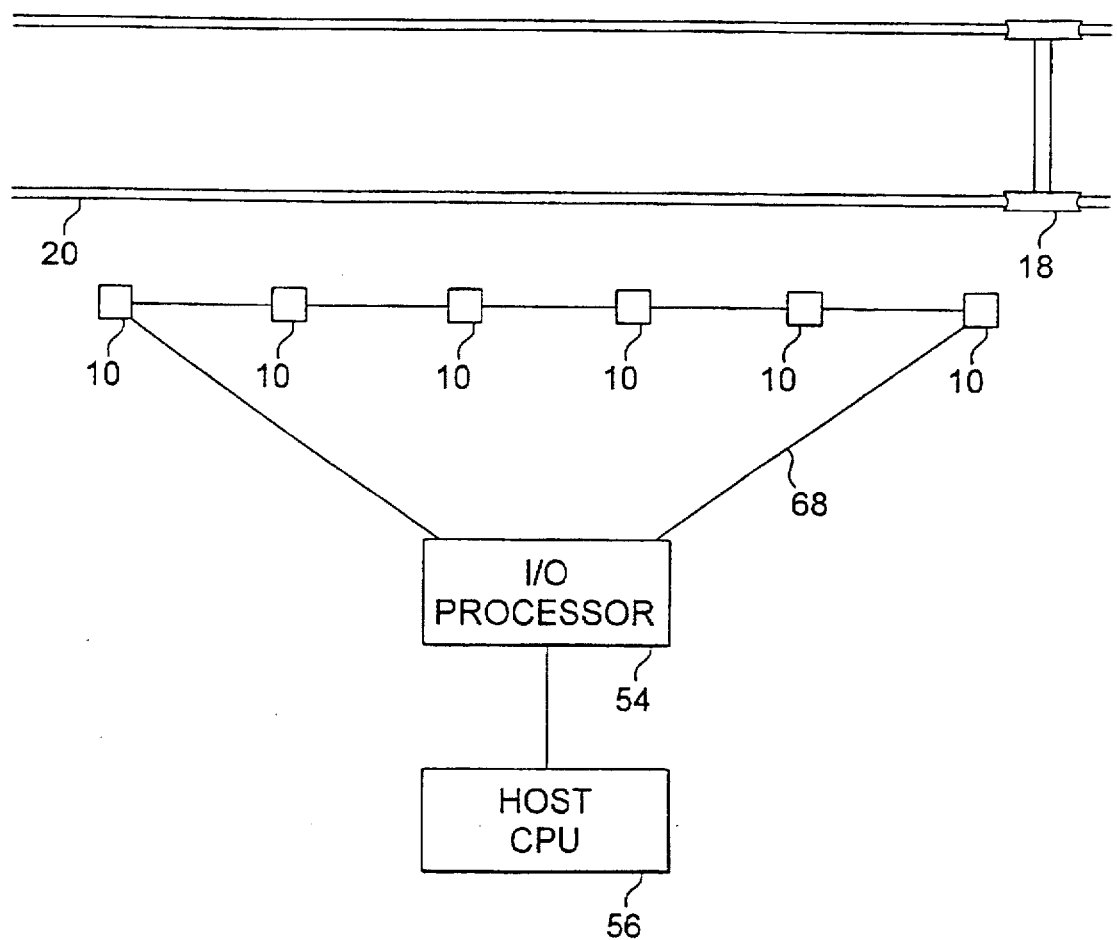
FIG. 9 is a plan view of a plurality of wheel detectors laterally spaced from a train rail in a token ring (deterministic) Local Area Network configuration.

FIG. 9 shows a plurality of wheel detectors 10 arranged in a token ring LAN configuration. Each wheel detector 10 is connected to a token ring 68 via the network controller 62. The data from the wheel detectors 10 is stored in the I\O processor 54 for transmission to the host central processing unit 56. The host central processing unit 56 initiates an orderly data transfer process that allows it to read all of the network controllers 62 in a sequential order. The system software measures the dynamic position, direction and velocity data through a specified linear distance in a predefined sequence. Acceleration calculations may also be obtained from a velocity profile over this linear stretch of track.

The token ring LAN is preferably used as a velocity profile generator inasmuch as the point velocities at successive positions along the rail 20 are successively measured as the token is sequentially passed throughout the token ring LAN. A number of point velocities are obtained and acceleration information may be efficiently determined in this LAN configuration. This system may be used in speed control applications in classification yards where the velocity of a car at numerous positions must be known.

Either LAN configuration will enhance the operation of the wheel detectors 10. The token ring LAN configuration is preferred when the wheel detector 10 is used in velocity profile and acceleration applications. Alternatively, the CSMA/CD configuration is preferred if the wheel detectors 10 are primarily used for determining wheel presence or linear direction, and the network loading is sufficiently low.

A schematic diagram of one embodiment of the invention is shown in FIG. 10. The transmitter antennas 42 of the MIRs 26 transmit the radar pulse signals 33 toward a first target area 22a and second target area 122a on a rail (not shown). The MIRs 26 generate indication signals 46a, 146a which correspond to the detection of a wheel 18 within the first target area 22a and the second target area 122a. The range control 38 of the MIRs 26 may be implemented with a plurality of range potentiometers 86a, 86b, 86c and the sensitivity control 45 may be implemented with a plurality of sensitivity potentiometers 87a, 87b 87c.

The indication signals 46 are applied to a plurality of buffers 63 and the buffered indication signals are applied to a counter controller 65 which includes a plurality of OR gates 77. The counter controller 65 directs the counter 66 to time the interval between a first indication signal 46 and a second indication signal 146. The output of the counter 66 is applied to the local central processing unit 60 for calculation of the linear velocity of the wheel 18.

The buffered indication signals are also applied to a plurality of one shots 72a, 72b, 72c. The one shots 72a, 72b, 72c hold the buffered indication signals for a sufficient amount of time thereby synchronizing each buffered indication signal from each MIR 26a, 26b, 26c. The matching of the buffered indication signals is required because each MIR 26a, 26b, 26c will consecutively detect a wheel 18 at different instants in time.

The output of the one shots 72a, 72b 72c in this embodiment is applied to a latch 55 for transmission to the local central processing unit 60. The local central processing unit 60 will address each wheel detector 10 via an address comparator 79 to initiate the transmission of the wheel detection data from the latch 55 to the local central processing unit 60.

The output of the one shots 72 is also applied to the logic processor 50. The output from the logic processor 50 is applied to the relays 52 for transmission to the I\O processor 54 via a discrete interface 53. The discrete interface 53 additionally provides a field test point for each individual wheel detector 10. In addition, a DC-DC converter 76 supplies a 5 volt signal to the 5 volt MIR 26 circuitry.

The chart below contains a list of components which may be used to construct the embodiment of the invention shown in FIG. 10:

| Reference Number | Part Description | Part Number | Supplier |
|---|---|---|---|
| 26 | MIR | ASIC | Lawrence Livermore Laboratory |
| 52 | Relay | 6200 Series | Coto Wabash |
| 55 | Latch | 74HC573 | Texas Instruments |
| 63 | Buffer | 74HC808 | Texas Instruments |
| 72 | One Shot | 74HC4538 | Motorola Corp. |
| 76 | DC-DC Converter | 24VDC-5VDC | Pico Electronics |
| 79 | Address Comparator | 74HC688 | Texas Instruments |
| 86, 87 | Potentiometer | 3099 Series | Bourns |

Although certain preferred embodiments have been described and shown herein, it is to be understood that various other embodiments and modifications can be made within the scope of the following claims.

What is claimed is:

1. An apparatus for indicating the presence of a rail vehicle on a set of spaced rails by detecting the presence of a wheel on one of such rails, comprising:
   a. a plurality of radar pulse generators for producing a plurality of radar pulse signals, wherein the reflectivity of said radar pulse signals is altered by contact with objects in the environment;
   b. a plurality of transmitters for emitting said radar pulse signals toward a target area above such one of such rails and said transmitters are connected to said radar pulse generators and said transmitters are laterally spaced from such one of such rails;
   c. a plurality of receivers corresponding to each of said transmitters for sampling a plurality of received radar pulse signals echoed from said target area and said receivers are laterally spaced from such one of such rails;
   d. at least one motion processor for generating an indication signal corresponding to each of said received radar pulse signals having an altered reflectivity from the movement of such wheel in said target area; and
   e. a logic processor connected to said at least one motion processor for generating a wheel detection signal in response to a plurality of said indication signals.

2. The apparatus of claim 1 wherein each of said radar pulse generators and said transmitters and said receivers and said at least one motion processor connected thereto are fabricated of monolithic semiconductor material.

3. The apparatus of claim 1 wherein a first receiver samples a first received radar pulse signal from a first target area and a second receiver samples a second received radar pulse signal from a second target area and said at least one motion processor generating a first indication signal corresponding to changes in reflectivity of said first received radar pulse signal and generating a second indication signal corresponding to changes in reflectivity of said second received radar pulse signal and said logic processor determines the direction of such wheel from said first indication signal and said second indication signal.

4. The apparatus of claim 1 wherein each of said receivers samples a first received radar pulse signal from a first target area and a second received radar pulse signal from a -second target area and said at least one motion processor generates a first indication signal corresponding to changes in reflectivity of said first received radar pulse signal and generates a second indication signal corresponding to changes in reflectivity of said second received radar pulse signal and said logic processor determines the linear point velocity of such wheel from said first indication signal and said second indication signal.

5. The apparatus of claim 4 further including a counter for timing the interval between said first indication signal and said second indication signal for determining the linear point velocity of such wheel.

6. The apparatus of claim 1 wherein said apparatus is physically separated from such rails.

7. The apparatus of claim 6 wherein said apparatus is positioned within four track widths of such one of such rails.

8. An apparatus for indicating the presence of a rail vehicle on a set of spaced rails by detecting the presence of a wheel on one of such rails, comprising:
   a. a radar pulse signal generator for producing a radar pulse signal, wherein the reflectivity of said radar pulse signal is altered by contact with objects in the environment;
   b. a transmitter connected to said radar pulse signal generator for emitting said radar pulse signal toward such one of such rails and said transmitter is laterally spaced from such one of such rails;
   c. a receiver for sampling a first received radar pulse signal echoed from a first target area above such one of such rails and a second received radar pulse signal echoed from a second target area above such one of such rails and said receiver is laterally spaced from such one of such rails: and
   d. a motion processor for generating a first indication signal in response to changes in the reflectivity of said first received radar pulse signal and generating a second indication signal in response to changes in the reflectivity of said second received radar pulse signal and said motion processor is connected to said receiver, and
   e. a counter for timing the interval between said first indication signal and said second indication signal and said counter is connected to said motion processor.

9. An apparatus for indicating the presence of a rail vehicle on a set of spaced rails by detecting the presence of a wheel on one of such rails, comprising:
   a radar pulse signal generator for producing a radar pulse signal, wherein the reflectivity of said radar pulse signal is altered by contact with objects in the environment;
   a transmitter connected to said radar pulse signal generator for emitting said radar pulse signal toward a target area above such one of such rails and said transmitter is laterally spaced from such one of such rails;
   a receiver for sampling a received radar pulse signal echoed from said target area and said receiver is laterally spaced from such one of such rails;
   a time delay device for adjusting the sampling time of said receiver and thereby defining said target area and said time delay device being interposed between said radar pulse signal generator and said receiver;
   a motion processor for generating a wheel detection signal in response to changes in the reflectivity of said received radar pulse signal and said motion processor is connected to said receiver;
   wherein said target area includes a first target area and a second target area and said received radar pulse signal includes a first received radar pulse signal and a second received radar pulse signal;
   wherein said receiver samples a first received radar pulse signal from said first target area and a second received radar pulse signal from said second target area and said motion processor generates a first indication signal corresponding to changes in the reflectivity of said first received radar pulse signal and a second indication signal corresponding to changes in the reflectivity of said second received radar pulse signal; and
   a counter for timing the interval between said first indication signal and said second indication signal for determining the linear point velocity of such wheel.

10. A method of indicating the presence of a rail vehicle on a set of spaced rails, comprising the steps of:
    a. transmitting a first radar pulse signal from a first fixed position laterally spaced from such rails toward a first target area above one of such rails;
    b. sampling a first portion of such first radar pulse signal corresponding to such first target area;
    c. analyzing such first portion to detect changes in the reflectivity of such first radar pulse signal corresponding to a presence of a wheel within such first target area;
    d. indicating such presence of such rail vehicle in response to a detection of such wheel in such first target area: and
    e. counting such indications of such wheels within such first target area.

11. A method of indicating the presence of a rail vehicle on a set of spaced rails, comprising the steps of:
    a. transmitting a plurality of radar pulse signals from a fixed position laterally spaced from such rails toward a plurality of target areas above one of such rails:
    b. sampling a first portion of each of such radar pulse signals corresponding to such target areas;
    c. analyzing such first portions to detect changes in the reflectivity of such radar pulse signals corresponding to a presence of a wheel within such target areas;
    d. indicating such presence of such rail vehicle in response to a detection of such wheel in such target areas; and
    e. determining a direction of such wheel.

12. A method of indicating the presence of a rail vehicle on a set of spaced rails, comprising the steps of:
    a. transmitting a plurality of radar pulse signals from a fixed position laterally spaced from such rails toward a plurality of target areas above one of such rails;
    b. sampling a first portion of each of such radar pulse signals corresponding to such target areas;
    c. analyzing such first portions to detect changes in the reflectivity of such radar pulse signals corresponding to a presence of a wheel within such target areas;
    d. indicating such presence of such rail vehicle in response to a detection of such wheel in such target areas; and
    e. counting such wheel within such target areas.

* * * * *